July 26, 1955
A. ARNEJO
2,714,138
SWITCH CONSTRUCTION FOR CONTROL SYSTEM FOR
AUTOMOBILE HEADLIGHTS AND IGNITION SYSTEM
Filed Nov. 14, 1952
2 Sheets-Sheet 1
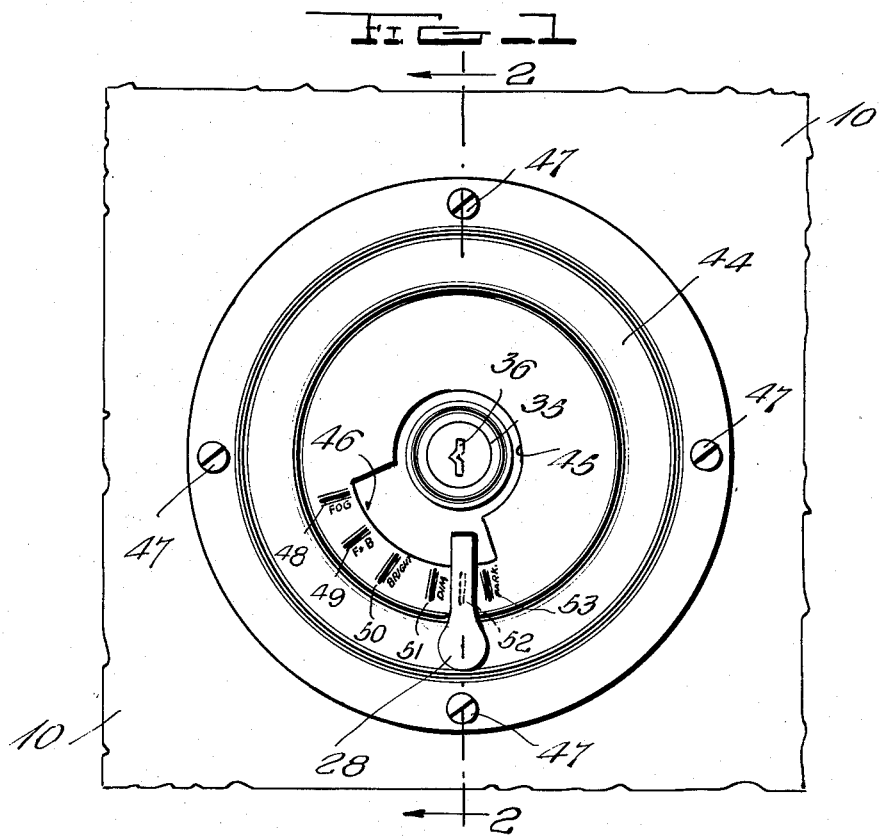
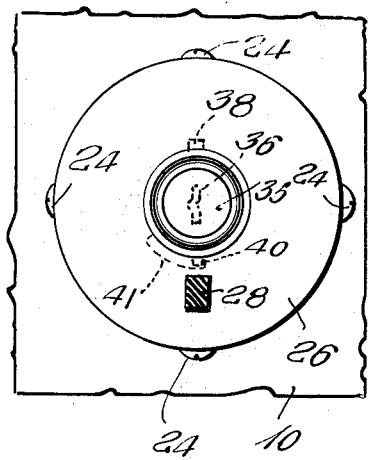
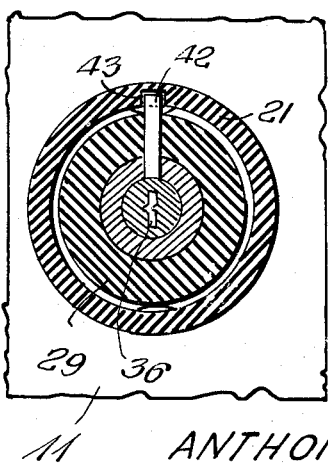
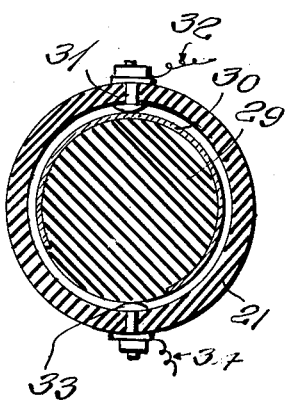
INVENTOR
ANTHONY ARNEJO,
BY Felix A. Russell
ATTORNEY

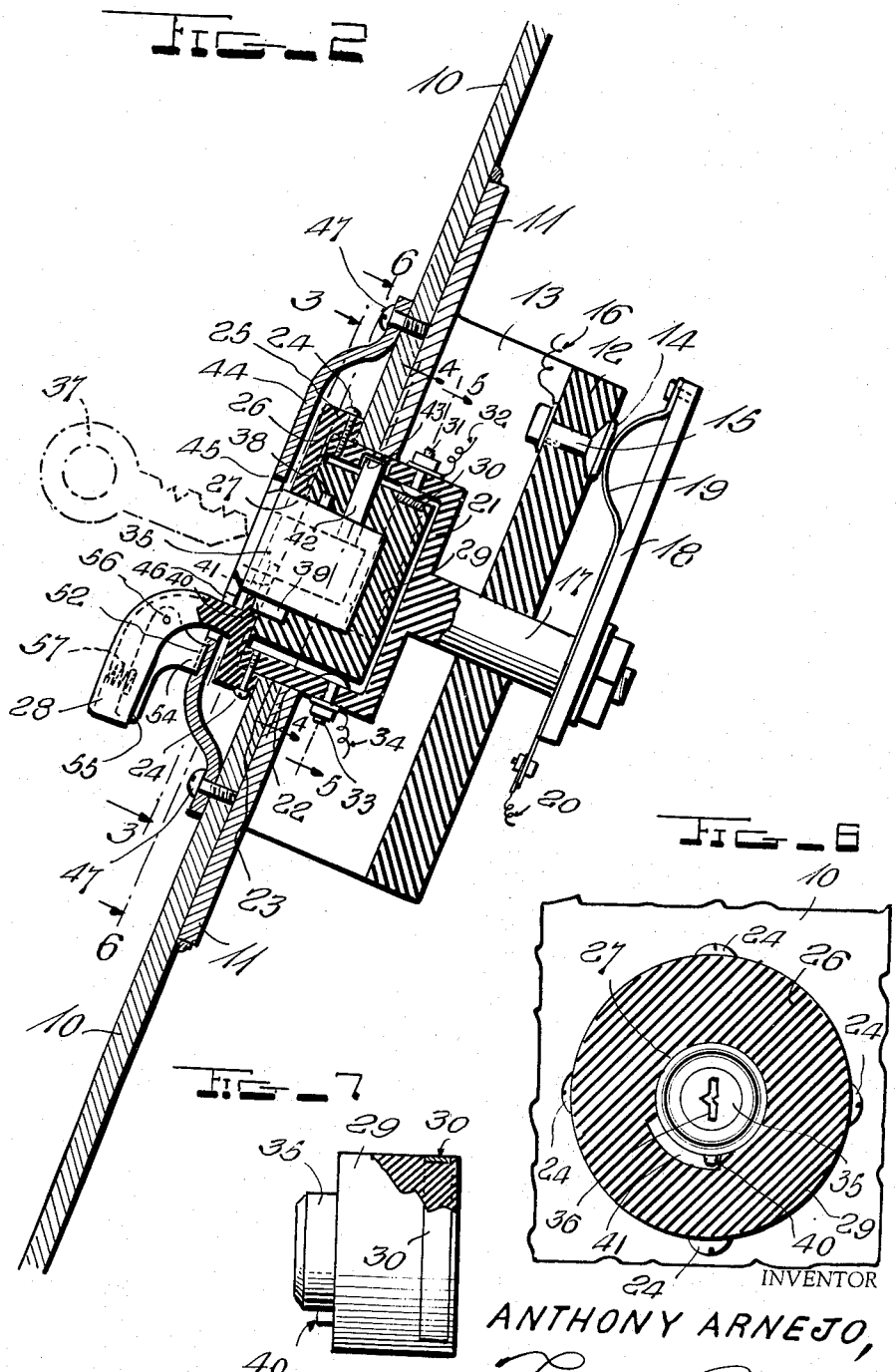

United States Patent Office 2,714,138
Patented July 26, 1955

2,714,138

SWITCH CONSTRUCTION FOR CONTROL SYSTEM FOR AUTOMOBILE HEADLIGHTS AND IGNITION SYSTEM

Anthony Arnejo, Detroit, Mich.

Application November 14, 1952, Serial No. 320,419

4 Claims. (Cl. 200—44)

The present invention relates to a switch construction for automobile headlights and it consists in the combinations, constructions and arrangements of parts herein described and claimed.

Generally the present invention constitutes an improvement upon my copending application entitled Control System for Automobile Headlights, filed October 9, 1952, and bearing Serial No. 313,939. The present improvement includes a lock-controlled switch for an ignition system which switch is mounted in and forms a part of a control shaft shown in the above-mentioned copending application. In addition, there is provided a novel cover plate forming a part of the invention and a novel trigger-actuated mechanism for holding the aforesaid shaft in preselected positions. Other novel features are also included as a part of the invention.

It is accordingly an object of the invention to provide a device of the character set forth having incorporated therein a novel lock-controlled switch forming a part of the invention.

Another object of the invention is to provide, in a device of the character set forth, a novel trigger-actuated latch forming a part of the invention.

A further object of the invention is the provision, in a device of the character set forth, of a novel cover plate forming a part of the invention.

A further object of the invention is to provide a device of the character set forth which is simple in construction, inexpensive to manufacture and yet effective and efficient in use, and which device is capable of quick and easy assembly.

Other and further objects of the invention will become apparent from a reading of the following specification taken in conjunction with the drawings, in which:

Figure 1 is a front elevational view of an embodiment of the invention shown mounted in a dashboard of a motor vehicle, Figure 2 is a fragmentary vertical sectional view taken along line 2—2 of Figure 1, Figure 3 is a sectional view taken along line 3—3 of Figure 2, Figure 4 is a sectional view taken along line 4—4 of Figure 2, Figure 5 is a sectional view taken along line 5—5 of Figure 2, Figure 6 is a sectional view taken along line 6—6 of Figure 2, and Figure 7 is a side elevational view, partly broken away, illustrating certain elements of the invention.

Referring more particularly to the drawings, there is shown therein a device of the character set forth including an automobile dashboard 10 to the rear face of which is affixed a panel 11. A board 12 is mounted in spaced relation to the panel 11 by means of legs 13 and carries a plurality of contact heads 14 upon the outer side thereof, such heads being connected through the board 12, as indicated at 15 and having wires 16 connected to the rear portions thereof, which wires form parts of certain electrical circuits controlling the various lamps in the vehicle. A shaft 17 extends revolubly through the board 12 and carries on its outer end portion an arm 18 to which is attached contact plate 19 which is likewise connected by a wire 20 to the aforementioned electrical circuits. All of the above has been shown and described in the aforementioned copending application and forms in itself no part of the present invention.

That end portion of the shaft 17 remote from the arm 18 has formed integrally therewith a hollow cylinder 21 which extends through openings 22 and 23 formed in the panel 11 and dashboard 10, respectively. To that portion of the cylinder 21 which protrudes through the dashboard 10 there is affixed by means of screws 24 the inwardly extending flange 25 of a cap 26 which is provided with a central circular opening 27.

An outwardly and downwardly extending handle 28 is formed integrally with the outer face of the cap 26 and it will be apparent that the shaft 17, the cylinder 21, the cap 26 and the handle 28 are all formed of plastic material.

Mounted for revoluble movement within the cylinder 21 is a cylindrical block 29 of plastic material having embedded in its peripheral portion an arcuate band 30 of copper or the like. A fixed contact member 31 extends radially through the wall of the cylinder 21 and has connected thereto at its outer end a wire 32 which leads to the conventional coil (not shown) of an ignition system. Diametrically opposed to the contact 31 is a fixed contact 33 to whose outer end is connected a wire 34 which leads to the battery (not shown) of the vehicle. It will be apparent that the fixed contacts 31 and 33 are adapted to come into sliding contact with the band 30 as the block 29 is revolved.

Centrally embedded in the block 29 is a conventional cylinder-type lock 35 provided with a key slot 36 for the reception therein of a key 37. Extending outwardly from the lock 35 is an ear 38 which is embedded in the body of the block 29, and, in diametrically opposed relation to the ear 38 there is provided an outwardly extending ear 39 which likewise is partially embedded in the block 29 but which extends forwardly therefrom, as indicated at 40, the portion 40 being positioned in an arcuate recess 41 formed in the inner face of the cap 26 adjacent the opening 27.

The lock 35 is provided with a conventional radially extending bolt 42 which is adapted to engage in an opening 43 formed in the inner wall of the cylinder 21 when the lock is closed but which may be withdrawn therefrom when the key 37 is utilized to open the lock.

A cover plate 44 is adapted to encompass that portion of the apparatus which extends upon the forward side of the dashboard 10 and is provided with a centrally disposed circular opening 45 through which the outer portion of the lock 35 partially extends and is also provided with an arcuate slot 46 which communicates with the opening 45 and provides a means for the handle 28 to extend through the plate 44. The plate 44 is affixed to the dashboard 10 by means of screws 47 or the like.

A plurality of radially extending circumferentially spaced grooves 48, 49, 50, 51, 52 and 53 is formed in the plate 44 adjacent the slot 46 and a latch 54 is adapted to selectively engage in such notches. The latch 54 has integrally formed therewith a dependent trigger 55 and is pivotally mounted upon a pin 56 in the upper portion of the handle 28. A compression spring 57 is mounted in the handle 28 and is adapted to bear against the inner side of the trigger 55 to thereby urge the latch 54 normally into the grooves aforesaid, as, for example, the groove 52 as shown in Figure 2.

It will be seen that the grooves 48, 49, 50, 51, 52 and 53 respectively represent the positions the handle 28 must assume in order for the contact 19 to properly contact one of the fixed contact members 14 to complete electrical circuits to the fog lights, the fog lights and bright lights, the bright lights, the dim lights, the "off" position and the parking lights of the vehicle in which the device forms a part.

In operation, it will be apparent that the ignition system of the vehicle in which the device is mounted may be controlled by the key 37 and that when the ignition circuit is open, the bolt 42 will be engaged in the opening 43 to thus lock the ignition circuit in such open condition. In this condition, it will be apparent that only one of the fixed contacts, namely the contact 31 will be in contact with the band 30 while the other fixed contact 33 will be out of contact therewith thus making the circuit open. When, however, it is desired to start the motor of the vehicle, it is only necessary to insert the key 37 and turn the same in conventional manner to withdraw the bolt 42 from the opening 43. This will permit the lock 35 and the block 29 attached thereto to revolve the distance of the slot 41 due to the restraining action of the projection 40 in such recess 41. When the lock and block have been revolved in this manner, the band 30 will come into contact with the fixed contact 33 at the same time remaining in contact with the fixed contact 31 thus completing the ignition circuit to close the same. It will also be apparent that the lighting system of the vehicle may be controlled in the manner set forth in my copending application above referred to by moving the handle 28 to any desired position with regard to the various grooves 48 to 53, inclusive, as aforesaid. To effectuate this movement, it is only necessary to move the trigger 55 against the action of the spring 57 to thus release the latch 54 from any particular groove whereupon the handle may be turned to another position and when the trigger 55 is freed, the action of the spring 57 will again force the latch 54 into the adjacent groove. This movement of the handle 28 will cause a corresponding turning of the cap 26, the cylinder 21 and the shaft 17 to thus move the arm 18 and its allied mechanisms as aforesaid.

While but one form of the invention has been shown and described herein, it will be readily apparent to those skilled in the art that many minor modifications may be made without departing from the spirit of the invention or the scope of the appended claims.

What is claimed is:
1. A device of the character described comprising in combination with a vehicle control panel and a lamp circuit controlling shaft, the provision of a hollow cylinder formed at the rearward end of said shaft and extending revolubly through said panel, a cap affixed to the rearward end of said hollow cylinder and having a central opening therein, a cylindrical block of dielectric material revolubly mounted in said hollow cylinder, an arcuate band of electrically conductive material affixed in the peripheral portion of said block, a pair of fixed contacts mounted at diametrically opposed points upon the inner wall of said cylinder and adapted to abut said band, an ignition circuit including said fixed contacts, a cylindrical lock centrally affixed in said block, said cylinder having a recess in its inner wall, a radially extending bolt operable by said lock and receivable in said recess, a downwardly and outwardly disposed handle affixed to the outer face of said cap, and a cover plate for said cap affixed to said panel and having a central circular opening for the exposed rearward end of said lock, and an arcuate slot communicating with said central circular opening for the extension of said handle therethrough.

2. A device as defined in claim 1 wherein means is provided for latching said handle in selected positions.

3. A device as defined in claim 1 wherein means is provided for latching said handle in selected positions, said means including a plurality of radially extending circumferentially spaced notches formed in said cover plate adjacent the arcuate slot therein, a latch member receivable in said notches and pivoted to said handle, a trigger formed integrally with said latch member, and a compression spring carried by said handle and bearing against said trigger to normally urge said latch into one of said grooves.

4. A device as defined in claim 1 wherein means is provided for limiting the rotary movement of said block, said means including a rearwardly extending dog affixed to said lock, and an arcuate groove formed in the inner face of said cap wherein is positioned the outer end of said dog.

References Cited in the file of this patent
UNITED STATES PATENTS

| | | |
|---|---|---|
| Re. 16,030 | Winning | Mar. 24, 1925 |
| 1,434,769 | Briggs et al. | Nov. 7, 1922 |
| 1,593,739 | Winning | July 27, 1926 |
| 1,608,585 | Douglas | Nov. 30, 1926 |